United States Patent [19]
Elvin

[11] 3,974,435
[45] Aug. 10, 1976

[54] MEANS FOR SUPPLYING A LOAD OBJECT
[75] Inventor: Sten Elvin, Vasteras, Sweden
[73] Assignee: Allmanna Svenska Elektriska Aktiebolaget, Vasteras, Sweden
[22] Filed: Dec. 24, 1974
[21] Appl. No.: 536,229

[30] Foreign Application Priority Data
Jan. 24, 1974  Sweden.............................. 7400892

[52] U.S. Cl. .................................. 321/9 A; 318/139; 318/341; 318/345; 321/43
[51] Int. Cl.² ........................................ H02P 13/32
[58] Field of Search ............ 307/240; 318/139, 341, 318/345; 321/9 R, A, 43, 45 C

[56] References Cited
UNITED STATES PATENTS

| | | | |
|---|---|---|---|
| 3,559,017 | 1/1971 | Dinger ............................. | 318/341 X |
| 3,833,848 | 9/1974 | Petersen ............................ | 321/9 A |

FOREIGN PATENTS OR APPLICATIONS

| | | | |
|---|---|---|---|
| 305,028 | 10/1968 | Sweden.............................. | 321/9 R |

Primary Examiner—A. D. Pellinen

[57] ABSTRACT

For supplying a load, such as motor for rail vehicles, with direct voltage pulses with a variable frequency from a direct voltage source, a pulse generating member is connected between the source and the load and delivers direct voltage pulses with a variable frequency to the load. The pulsing member can be switched for the pulsing in groups or symmetrical pulsing. When pulsing in gropus, it delivers pulses in groups of two pulses with a constant time interval $T_1$ between the two pulses of each group. A control arrangement is provided for switching the pulse generating member to symmetrical pulsing when, in the case of pulsing in groups, the group frequency exceeds a value of substantially $(K/2T_1)$, where 0.5 is $< K < 1$. Immediately after switching to symmetric pulsing, the working frequency is brought to $(K/T_1)$.

8 Claims, 6 Drawing Figures

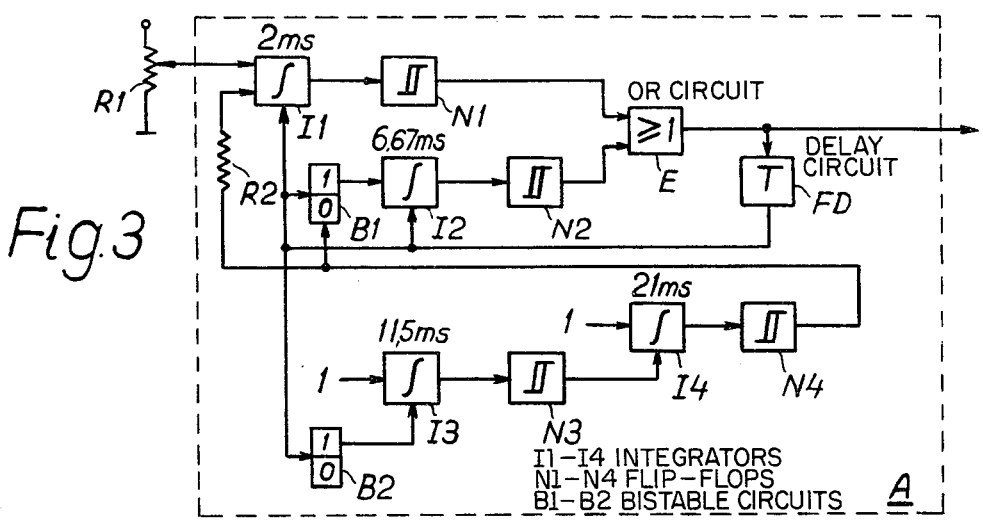
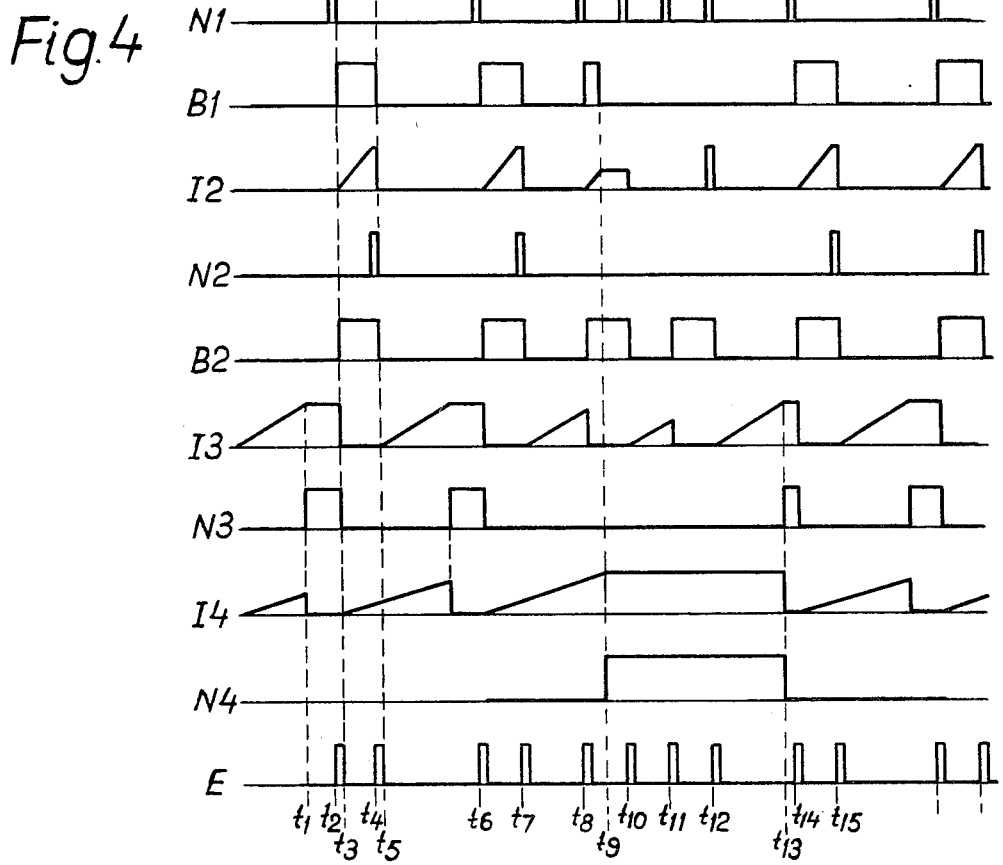

MEANS FOR SUPPLYING A LOAD OBJECT

BACKGROUND OF THE INVENTION

1. Field of the Invention

The present invention relates to a device for supplying a load object with direct voltage pulses with a variable frequency from a direct voltage source, said device comprising a pulse-generating member for connection between the direct-voltage source and the load object and arranged to deliver direct voltage pulses with a variable frequency to the load object, which member is switchable between pulsing in groups and symmetrical pulsing, and, in the case of pulsing in groups, delivers pulses in groups of two pulses with a constant time interval between the two pulses of each group.

2. The Prior Art

In devices of this kind, the current flowing from the direct voltage source consists of periodic current pulses, which means that the current has a DC component as well as an AC component consisting of a fundamental tone and a number of harmonics. In certain fields of application, an AC component with a certain frequency may be harmful. This is the case, for example, in rail vehicle operation, where the engines of the vehicle are supplied from a live contact line or contact rail by way of one or more direct voltage convertors placed in the vehicle, which are used for the control of the engines. Usually signal systems are used in this case which transmit information to the vehicle, preferably regarding the allowed speed, with the help of a coded or modulated carrier frequency signal transferred, for example, by way of the rail. In a typical case, the carrier frequency is 75 Hz. It is of great importance that the signal system will not be disturbed by the load current of the vehicle. It is possible, in a manner known per se, to control the direct voltage convertor so that the current flowing form the source consists of pulse groups with a definite number of pulses in each group, with a constant time interval between the pulses in the group and with a variable time interval between the groups. In this way, a certain discrete frequency (the above-mentioned carrier frequency) can be completely eliminated from the current flowing from the source.

According to a known control principle, the current pulsing from the source consists of pulse groups with two pulses in each group, the time interval between which is constant. The time interval between two consecutive groups may be varied so that the average value of the direct voltage applied to the object may be controlled.

The AC component of the current contains a fundamental tone with a frequency which is the same as the frequency with which the pulse groups appear and in addition there is a great number of harmonics. The frequency $f_0 = (1/2T_1)$, where $T_1$ is the time between the two pulses of a group, will be missing from these harmonics, and, by choosing the time between successive pulses of each group suitably a certain frequency may be completely avoided.

In the known system, in order to increase the average value of the voltage on the load object, the time between the groups is decreased. When the time between pulses is equal to that between groups, there is so-called symmetrical pulsing. The fundamental tone has completely disappeared. When the load voltage is further increased, the time interval between the pulses is reduced while maintaining symmetrical control.

A problem in devices of this kind is that frequently it is not sufficient to eliminate only one single discrete frequency. In the signal system for vehicles described above, a band pass filter tuned to the carrier frequency is usually included, which band pass filter is intended to let through the carrier frequency only. To be able to transmit information by coding the carrier frequency, the band pass filter must have a certain band width. This means that, even if the carrier frequency itself is eliminated by pulsing in groups, the fundamental tone or the harmonics may come within the pass band of the filter. Particularly the fundamental tone may find its way into the pass band of the filter and seriously disturb the signal system when the group frequency approaches $f_0$.

The disturbances can be particularly serious when several direct voltage convertors, independent of each other, are working in parallel and are controlled to have the same voltage, which is the case, for example, in a train consisting of several motor coaches. Disturbances with a frequency near the carrier frequency will give rise to beating, where the maximum amplitude of the disturbances is determined by the sum of the amplitudes of the disturbing current components from the different coaches. Furthermore, the heating may be interpreted by the signal system as a modulation or coding of the carrier frequency, and therefore, for example, may cause the vehicle to be allowed to continue running in spite of the fact that a signal for such an allowance has never been sent to the vehicle.

SUMMARY OF THE INVENTION

The present invention relates to a device of the kind described above, in which the disadvantages now described are eliminated to a very high degree.

According to the invention, control means are provided for switching the pulse generating member to symmetric pulsing when, in the case of pulsing in groups, the group frequency exceeds a value of substantially $(K/2T_1)$, where 0.5 is $< K < 1$ and $T_1$ is the time interval between two pulses of each group. These control means also affect the working frequency of the pulse generating member in such a way that, immediately after switching to symmetric pulsing, the pulse frequency is $K/T_1$. The control means also includes means to switch the pulse generating member to pulsing in groups, when, in the case of symmetrical pulsing, the pulse frequency pulse falls below a value of substantially $K_1/T_1$ where $K_1 < K$.

BRIEF DESCRIPTION OF THE DRAWINGS

The invention will be described in the following with reference to the accompanying drawings, in which FIG. 3 shows the detailed construction of the control device and FIG. 4 shows the signals appearing in the control device.

DESCRIPTION OF THE PREFERRED EMBODIMENTS

Figure 1A:
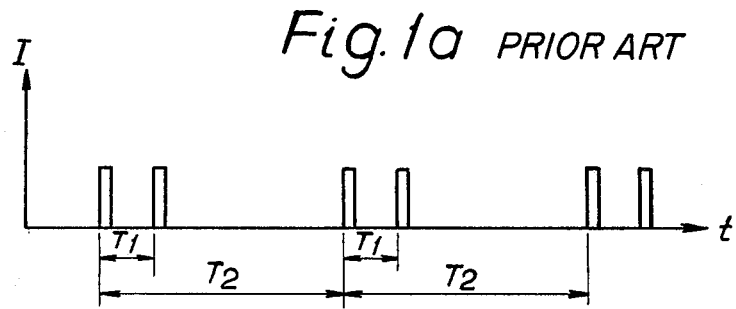
FIGS. 1a, 1b and 1c show the operation of a previously known supply means.

This known control principle is shown in FIG. 1a where the current flowing from the source is shown as a function of time. The current consists of pulse groups with two pulses in each group. The time interval $T_1$ between the two pulses of each group is constant. The time interval $T_2$ between two consecutive groups may be varied, and in this way the average value of the direct voltage supplied to the load object may be controlled.

The AC component of the current shown in FIG. 1a contains a fundamental tone with the frequency $(1/T_2)$, which frequency is the same as the frequency with which the pulse groups appear, the so-called group frequency. In addition to this, there is a great number of harmonics. The frequency $(1/2T_1) = f_0$ will always be missing from these harmonics. By choosing $T_1$ so that $f_0$ is equal to the carrier frequency of the signal system in the above-mentioned case, disturbances with this frequency will thus be completely avoided.

Figure 1B:
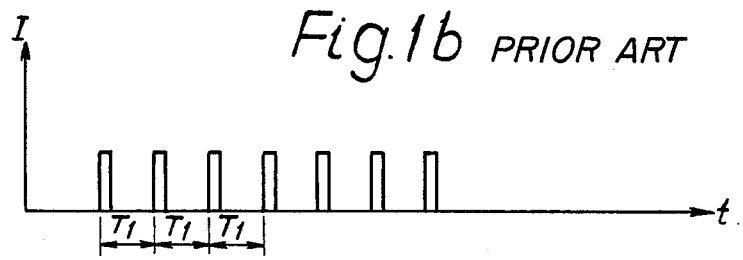
Figure 1C:
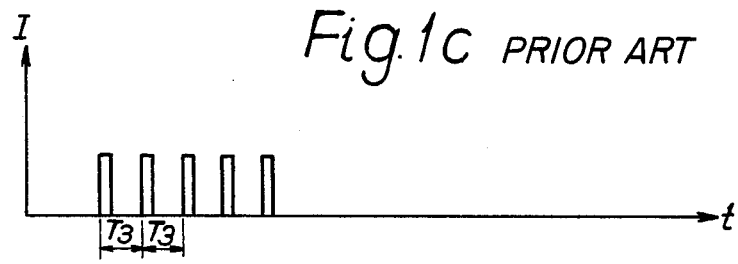

When, in the known system now described, it is desired to increase the average value of the voltage on the load object, $T_2$ is decreased. When $T_2$ has been reduced so far that $T_2 = 2T_1$, all intervals between two consecutive pulses will be equally long (see FIG. 1b), so-called symmetrical pulsing. The fundamental tone with the frequency $(1/T_2)$ has now completely disappeared and the fundamental tone has now the frequency $(1/T_1) = 2f_0$. When the load voltage is further increased, the time interval between the pulses is reduced while maintaining symmetrical control according to FIG. 1c ($T_3 < T_1$).

Figure 2:
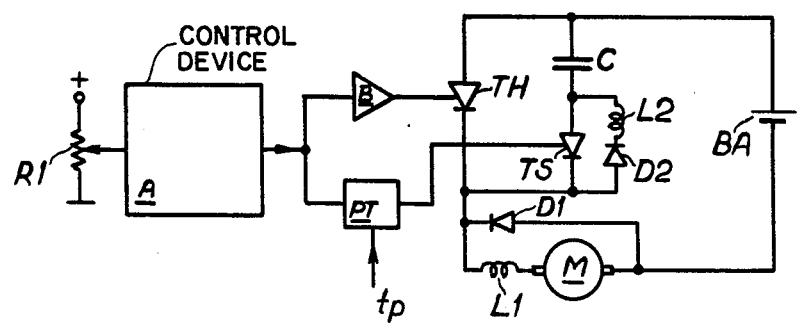
FIG. 2 shows schematically a device according to the invention.

FIG. 2 shows the main circuits, known per se, in a device according to the invention. A DC motor M is connected to a direct voltage source BA by way of a smoothing reactor L1 and a main thyristor TH. A freewheeling diode D1 is connected in parallel with the motor M and the reactor L1. A quenching circuit is connected in parallel with the main thyristor TH, which quenching circuit is built up in a known manner from a quenching condenser C, a quenching thyristor TS, a recharge reactor L2 and a recharge diode D2.

A control device A emits pulses with a frequency which is dependent on the voltage supplied to A from the control resistor R1, one end of which is connected to positive voltage and the other end of which is connected to the potential zero. The pulses from A are supplied to the main thyristor TH through a control pulse device B which converts these pulses into pulses having a length, amplitude and power level suitable for igniting TH. The pulses from A are also supplied to the quenching thyristor TS by way of a pulse time control circuit PT, which is essentially a delay circuit with a variable time delay between in- and outgoing pulses. The delay is controlled by a control signal which thus determines the pulse length $t_p$.

Each pulse from A immediately ignites the main thyristor TH. After the period $t_p$, an ignition pulse is delivered from PT to the quenching thyristor TS, the main thyristor thus being extinguished in known manner. The motor M is thus supplied with voltage pulses with a time interval between the pulses which is determined by the setting of the control resistor R1 and the control device A, and with a pulse length $t_p$ which is determined by the control signal to the circuit PT.

The whole device shown in FIG. 2 (except the source BA) may be arranged in a rail vehicle, and the motor M may be the drive motor of the vehicle. The source BA may then consist of a contact line or contact rail conducting direct voltage.

FIG. 3 illustrates the construction of the control device A in FIG. 2. It is built up of the integrators I1-I4, the level flip-flops N1-N4, the bistable circuits B1 and B2, the OR-circuit E and the delay circuit T. The signals in the device (except the input signals to I1) may assume either of two values, designated "0" and "1". The output signal of an integrator is set to zero if a signal 1 is supplied to the input shown on the underside of the symbol in the figure and remains zero for as long as this signal is 1. The output signal grows linearly with the time and with a speed proportional to the input signal. A signal 1 on the input gives the output signal the value 1 after the time indicated above the symbol. As regards the integrator I1, 2 ms is the time of integration obtained if the input signals have their maximum values.

The output signal of a level flip-flop is 1 if the input signal is 1, otherwise it is 0.

A bistable circuit in the 1 state delivers an output signal 1 and in the 0 state an output signal 0. A short "1" pulse on the input of the lefthand side of the symbol switches the circuit from the former condition to the latter condition. A 1 -signal on the input of the lower side of the symbol maintains the circuit in the 0 condition for as long as the signal lasts.

The output signal of the OR-circuit adopts the value 1 if one or both of the signals have the value 1.

When the input signal to the delay circuit FD changes its value from 0 to 1, the output signal changes its value from 0 to 1 after the time T, which is short, for example some 20 or 30 microseconds. When the input signal is changed from 1 to 0 the output signal is immediately changed from 1 to 0.

FIG. 4 shows the output signal from the units included in the control device. The output signal of the control device consists of the output signal from the OR-circuit E and is shown at the bottom of the figure.

Before starting all signals in the circuit are 0, as well as the voltage from the control resistor R1. At the time $t = 0$ the circuit is energized. Said voltage is increased to a low value. The integrators I1, I3 and I4 start working. At $t_1 = 11.5$ ms the output signal from I3 has reached the value 1 and I4 is set to zero by way of N3. At the time $t_2$, which is greater than 11.5 ms, I1 reaches the value 1 and the output signal from E becomes 1. At the time $t_3 = t_2 + T$ the output signal from FD switches to 1, I1 thus being set to zero and B1 and B2 switching to the 1 -condition. The output signal from E becomes 0 and I2 starts integrating, I3 is set to zero and I4 starts integrating. At $t_4 = t_3 + 6.67$ ms, I2 reaches the value 1 and the signal from E becomes 1. At $t_5 = t_4 + T$, FD, I1, I2, B1 and B2 are set to zero, the output signal from E becomes 0, and I1 and I3 start integrating.

For the sake of clarity, the time T is strongly exaggerated in FIG. 4. As will be seen the control device has delivered two pulses with a time interval of 6.67 ms between the pulses. Provided that the voltage from the control resistor R1 is so low that it takes more than 11.5 ms for I1 to integrate from 0 to 1, the procedure is repeated, and at $t_6$ and $t_7$ the control device delivers two further pulses with a mutual interval of 6.67 ms. Thus, in this condition the control device delivers double pulses with a fundamental tone having a highest frequency of $(10^3/6.67+11.5) = 55$ Hz, and where the frequency $10^3/(2 \times 6.67) = 75$ Hz is completely eliminated.

The signal from the control resistor R1 is now assumed to be increased (as from $t_7$) so far that the integration interval for I1 is somewhat less than 11.5 ms. At $t_8$ an output pulse is delivered from the control device.

Immediately after, at $t_9$, I4 reaches the value 1 and the output signal from N4 become 1. B1 is then locked in the position 0 and also a signal is added to the signal from the control resistor by way of R2. The resistance of R2 is so chosen that the integration interval for I1 will now be $(6.67 + 11.5)/2 = 9.1$ ms. Since B1 is locked in position 0, I2 will be inactive, and pulses are delivered at $t_{10}, t_{11}, t_{12}$ with a mutually equal time interval and with the frequency $(10^3/9.1) = 110$ Hz. By increasing the signal from the control resistor the pulse frequency can be increased in excess of said value up to $(10^3/2) = 500$ Hz (2 ms is the shortest integration interval for the integrator I1).

From the fundamental tone frequency 55 Hz during the pulsing in groups the control device has now switched directly to symmetrical pulsing with the fundamental tone frequency 110 Hz or higher.

We now assume that the signal from the control resistor R1 is reduced. The pulse frequency decreases but nothing happens until the integration interval of the integrator I1 falls below 11.5 ms, which corresponds to the frequency $(10^3/11.5) = 87$ Hz. We assume that the said integration interval as from $t_{12}$ is slightly less than 11.5 ms. At $t_{13}$ I3 reaches the value 1 and sets I4 and N4 to zero, B1, I2 and N2 thus being released. At $t_{14}$ I1 has reached the value 1 and an output pulse is delivered from the control device. After 6.67 ms I2 has reached 1 and a further output pulse is delivered (at $t_{15}$).

The system has now switched directly from symmetrical pulsing with the fundamental frequency 87 Hz to pulsing in groups. The additional signal through R2 is now zero, and, shortly after changing to group pulsing, the fundamental frequency will be about half as great as 87 Hz, that is about 43.5 Hz.

By making the change from pulsing in groups to symmetrical pulsing from 55 Hz to 110 Hz whereas the change from symmetrical pulsing to pulsing in groups is made from 87 Hz to 43.5 Hz, the system has a certain amount of hysteresis, thus obtaining distinct changes and avoiding oscillations.

Since the number of pulses per time unit is the same immediately after a change as immediately before, the changes between symmetrical pulsing and pulsing in groups do not cause any changes in the direct voltage supplied to the load object.

When the pulse frequency according to the process described above is increased from a low value up to its maximum value (500 Hz in the above example) the pulse width $t_p$ can suitably be kept at its minimum value the whole time. When the maximum frequency is attained, a further increase in the load voltage can be obtained in a known manner by increasing the pulse width. The constant K must have a value between 0.5 and 1, but preferably should lie between 0.6 and 0.9.

In the above example the control device controls one single direct voltage convertor. However in a vehicle, for example, there may be several convertors. These may be connected in parallel to a common load (the parallel-connected motors of the vehicle) or they may each supply a load object (a motor or a group of motors). The control device is then suitably arranged to control all the convertors in the vehicle. A distributing member is then introduced which distributes the pulses from the control device to the convertors in such a way that the first pulse from the control device is supplied to a first convertor, the next pulse to another convertor, and so on, until each convertor has been supplied with a pulse, and then the process starts again from the beginning. The total current obtained by the vehicle from the source then consists of pulses with the intervals indicated at the bottom of FIG. 4.

As is clear from the above description, in a device according to the invention the frequency of the fundamental tone can never lie within a wide band on both sides of the frequency where the sensitivity for disturbances is at its maximum. The disturbing effect is therefore strongly reduced compared with earlier known devices. Furthermore, since the frequencies of disturbing components are located far away from the frequency where the sensitivity is greatest, the interference components from different vehicles will add their R.M.S's and not their amplitudes. On the one hand, this means that the resulting interference amplitude will be lower, and on the other hand that the low-frequency beat, which could be interpreted as a modulation of the carrier frequency in earlier known devices, is avoided. In the absolute worst case, the interference amplitude can be so high that the coding of the carrier frequency is masked. Since, for reasons of security, signal systems of the present kind are designed so as to release a signal to stop or to lower the speed if the coded information disappears, this involves no appreciable inconvenience and is definitely no security risk.

I claim:

1. Means for supplying a load object (M) with direct voltage pulses with a variable frequency from a direct voltage source (BA), said means comprising a pulse-generating member (A, B, PT, TH, TS, ) for connection between the direct voltage source and the load object and including means to deliver direct voltage pulses with a variable frequency to the load object, which member is switchable between pulsing in groups and symmetrical pulsing, and in the case of pulsing in groups includes means to deliver pulses in groups of two pulses with a constant time interval $T_1$ between the two pulses of each group, the means comprising control means for switching the pulse-generating member to symmetrical pulsing when, in the case of pulsing in groups, the group frequency exceeds a value of substantially $(K/2T_1)$, where $0.6 < K < 0.9$ and $T_1$ is the time interval between 2 pulses of each group.

2. Means according to claim 1, in which the control means includes means to affect the working frequency of the pulse-generating member in such a way that immediately after switching to symmetrical pulsing the pulse frequency $(K/T_1)$.

3. Means according to claim 1, in which the control means includes means to switch the pulse-generating member to pulsing in groups when, in the case of symmetrical pulsing, the pulse frequency falls below a value of substantially $(K_1/T_1)$, where $K_1 < K$.

4. Means according to claim 3, in which the control means includes means to affect the working frequency of the pulse-generating member in such a way that, immediately after switching to pulsing in groups, the group frequency is $(K_1/2T_1)$.

5. A method for supplying a load object (M) with direct voltage pulses with a variable frequency from a direct voltage source through a pulse generating member, which member is switchable between pulsing in groups and symmetrical pulsing, and in the case of pulsing in groups delivers pulses in groups of two pulses with a constant time interval $T_1$ between the two pulses of a group, said method comprising the step of switching from pulsing in groups to symmetric pulsing when, in the case of pulsing in groups, the group frequency exceeds a value $(K/2T_1)$ where $0.6 < K < 0.9$.

6. A method as claimed in claim 5, which includes controlling the working frequency of the pulse-generating member in such a way that immediately after switching to symmetrical pulsing the pulse frequency is $(K/T_1)$.

7. A method as claimed in claim 5, which includes switching the pulse-generating member to pulsing in groups when, in the case of symmetrical pulsing, the pulse frequency falls below a value of substantially $(K_1/T_1)$, where $K_1 < K$.

8. A method as claimed in claim 7, which includes controlling the working frequency of the pulse-generating member in such a way that, immediately after switching to pulsing in groups, the group frequency is $(K_1/2T_1)$.

* * * * *